Patented July 12, 1927.

1,635,500

UNITED STATES PATENT OFFICE.

HAROLD EDWIN POTTS, OF LIVERPOOL, ENGLAND, ASSIGNOR TO THOMAS BLANDFORD AND ALFRED GEE, BOTH OF DONCASTER, ENGLAND.

PROCESS OF CEMENTATION IN THE GROUND.

No Drawing. Application filed March 30, 1926, Serial No. 98,622, and in Great Britain October 14, 1925.

This invention relates to an improved process of cementation in the earth. When it is desired to sink shafts through water-bearing strata, e. g. in coal mining, difficulties are caused because of the leakage of large quantities of water into the shaft. Accordingly it has been proposed to prevent this leakage by preparing the ground through which the shaft is to be sunk either by freezing the water or by the injection of a suspension of cement in water. For example, suppose that a shaft has been sunk a certain distance without difficulty and it is then found that the ground beneath the bottom is traversed by fissures through which water would flow into the shaft; in such cases, a series of bore holes are sunk through the water-bearing strata and the cement suspension is pumped into these bore holes with the object of causing the cement to fill up the fissures so that the shaft can then be sunk further without leakage.

Now in performing this process of cementation it has been found that there is a difficulty in forcing a sufficient quantity of cement into the fissures since these fissures adjacent to the bore holes are filled up and become impermeable to the cement suspension. This is shown in a rapid increase in the pressure required to force the cement suspension down the bore holes.

Proposals have already been made to make the strata impermeable by the alternate injection through bore holes of solutions of sodium silicate and alum which react to form an insoluble colloidal precipitate in situ. It has further been proposed to mix sodium silicate and alum to form a colloidal precipitate and to inject this mixture into the bore holes as a preliminary step prior to the injection of the cement suspension.

Now according to the present invention, it has been found that excellent results can be obtained by a very much simpler way, viz, by the use of a single solution of caustic alkali as distinct from the use of a solution such as a mixture of sodium silicate and alum which contains a colloidal precipitate. This is both cheap and effective and easy to use as compared with the processes employing two solutions. According to my invention, therefore, I employ a solution of caustic alkali preferably caustic soda. If desired, organic substances may be present together with the caustic alkali, e. g. I may use soap solution or I may add other substances which lower the surface tension of water. The term caustic alkali includes caustic soda or potash with or without organic bodies and includes alkali carbonates but not silicates.

I inject the caustic alkali solution as a separate step prior to the injection of the cement suspension or grout for the purpose of preparing the bore holes so that the particles of cement will pass freely thereto. If the cement suspension or grout is injected initially without prior preparation of the bore holes, it is found that the desired amount of cement cannot be introduced, since the pressure rises and apparently a blockage occurs. The object of the caustic alkali treatment is to prevent the occurrence of this blockage in the subsequent step of injection of cement.

*Example.*

As an example of an actual experiment, I may mention that in driving a shaft through water-bearing strata, it was found that large quantities of water were present. Accordingly a series of bore holes were driven through the water-bearing strata and water was first pumped into each bore hole, then a dilute solution of caustic soda was pumped in and then a suspension of cement in water was pumped in.

For example, in one bore hole, diameter 1½ inches, 40 gallons of water were pumped in followed by 200 gallons of 1% solution of caustic soda after which it was possible to inject about 300 lbs. of cement suspended in water, first in the form of a dilute suspension and afterwards in the form of a concentrated suspension. After a satisfactory weight of cement had been injected the pressure had risen to 450 lbs. to the square inch and injection was then discontinued and the bore hole sealed up.

On further boring out the shaft it was found that the fissures had all been satisfactorily sealed by the setting of the cement.

The invention is not limited to any particular proportions of caustic alkali.

In these experiments the pressure at the end of the injection of cement rose to about 450 lbs. per square inch, but in other fissures it is possible to introduce the cement at considerably lower pressure.

It is not desirable to introduce the cement at much higher pressure than this unless the bore hole is sunk to a very considerable depth.

I declare that what I claim is—

1. The process of sealing fissures in water-bearing strata which comprises injecting a solution of caustic alkali into the strata and then injecting a cement suspension into the strata.

2. The process of sealing fissures in water-bearing strata which consists in preparing bore holes for the injection of cement suspension by introducing therein a solution of caustic soda in substantial absence of other reagents and then injecting a cement suspension.

3. The process of sinking shafts in water-bearing strata which consists in sealing the fissures by driving a plurality of bore holes, injecting said bore holes as in claim 1 and finally sinking the shaft through the strata and the fissures thus filled.

In witness whereof, I have hereunto signed my name this 19th day of March 1926.

HAROLD E. POTTS.